US012801695B2

(12) United States Patent
Kobren et al.

(10) Patent No.: US 12,801,695 B2
(45) Date of Patent: Nov. 17, 2026

(54) AUGMENTING DATA SETS FOR SELECTING MACHINE LEARNING MODELS

(71) Applicant: Oracle International Corporation, Redwood Shores, CA (US)

(72) Inventors: Ariel Gedaliah Kobren, Cambridge, MA (US); Swetasudha Panda, Burlington, MA (US); Michael Louis Wick, Lexington, MA (US); Qinlan Shen, Burlington, MA (US); Jason Anthony Peck, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1074 days.

(21) Appl. No.: 17/903,796

(22) Filed: Sep. 6, 2022

(65) Prior Publication Data

US 2023/0401285 A1 Dec. 14, 2023

Related U.S. Application Data

(60) Provisional application No. 63/352,103, filed on Jun. 14, 2022.

(51) Int. Cl.
*G06F 18/214* (2023.01)
*G06F 18/21* (2023.01)

(52) U.S. Cl.
CPC .......... *G06F 18/214* (2023.01); *G06F 18/217* (2023.01)

(58) Field of Classification Search
CPC ...... G06F 18/214; G06F 18/217; G06N 20/00
See application file for complete search history.

(56) References Cited

U.S. PATENT DOCUMENTS

| | | | | |
|---|---|---|---|---|
| 6,380,934 | B1 * | 4/2002 | Freeman | G06T 7/41 345/473 |
| 11,669,687 | B1 | 6/2023 | Joshi et al. | |
| 11,704,506 | B2 | 7/2023 | Sellam et al. | |
| 2005/0102614 | A1 | 5/2005 | Brockett et al. | |
| 2007/0129935 | A1 | 6/2007 | Uchimoto et al. | |
| 2008/0256057 | A1 | 10/2008 | Riise et al. | |
| 2009/0119090 | A1 | 5/2009 | Niu et al. | |
| 2016/0180245 | A1 | 6/2016 | Tereshkov et al. | |
| 2018/0189272 | A1 | 7/2018 | Noh et al. | |

(Continued)

FOREIGN PATENT DOCUMENTS

CN 109522541 A 3/2019

OTHER PUBLICATIONS

Joseph, V. Roshan. "Optimal ratio for data splitting." Statistical Analysis and Data Mining: The ASA Data Science Journal 15.4 ( 2022): 531-538. (Year: 2022).*

(Continued)

*Primary Examiner* — Andrew T Chiusano
(74) *Attorney, Agent, or Firm* — Invoke

(57) ABSTRACT

Techniques are disclosed for augmenting data sets used for training machine learning models and for generating predictions by trained machine learning models. The techniques generate synthesized data from sample data and train a machine learning model using the synthesized data to augment a sample data set. Embodiments selectively partition the sample data set and synthesized data into a training data and a validation data, which are used to generate and select machine learning models.

22 Claims, 5 Drawing Sheets

(56) References Cited

U.S. PATENT DOCUMENTS

| | | | | |
|---|---|---|---|---|
| 2018/0330254 | A1* | 11/2018 | Kratz | H04Q 9/00 |
| 2019/0027133 | A1 | 1/2019 | Georges et al. | |
| 2019/0057081 | A1 | 2/2019 | Choi et al. | |
| 2019/0088250 | A1 | 3/2019 | Kim et al. | |
| 2019/0155856 | A1 | 5/2019 | Tian et al. | |
| 2019/0213256 | A1 | 7/2019 | Watson et al. | |
| 2019/0219716 | A1* | 7/2019 | O'Toole | G01V 1/288 |
| 2019/0349321 | A1 | 11/2019 | Cai et al. | |
| 2019/0354895 | A1 | 11/2019 | Vasudevan et al. | |
| 2019/0355346 | A1 | 11/2019 | Bellegarda | |
| 2019/0370336 | A1 | 12/2019 | Prakash et al. | |
| 2020/0004876 | A1 | 1/2020 | Sinha et al. | |
| 2020/0013407 | A1 | 1/2020 | Chae | |
| 2020/0097820 | A1 | 3/2020 | Song et al. | |
| 2020/0134442 | A1 | 4/2020 | Sim et al. | |
| 2020/0184151 | A1 | 6/2020 | Ekmekci et al. | |
| 2020/0210848 | A1* | 7/2020 | Kour | G06N 3/045 |
| 2020/0226212 | A1 | 7/2020 | Tan et al. | |
| 2020/0241917 | A1 | 7/2020 | Chen et al. | |
| 2020/0302273 | A1 | 9/2020 | Chung et al. | |
| 2020/0334336 | A1 | 10/2020 | Azermai | |
| 2020/0342182 | A1 | 10/2020 | Johnson et al. | |
| 2020/0410345 | A1 | 12/2020 | Morishita et al. | |
| 2021/0012156 | A1 | 1/2021 | Vijaykeerthy et al. | |
| 2021/0064826 | A1 | 3/2021 | Rajagopal et al. | |
| 2021/0089703 | A1 | 3/2021 | Misawa et al. | |
| 2021/0173872 | A1 | 6/2021 | Tan et al. | |
| 2021/0224486 | A1 | 7/2021 | Stabler et al. | |
| 2021/0326751 | A1 | 10/2021 | Liu et al. | |
| 2021/0334459 | A1 | 10/2021 | Dvijotham et al. | |
| 2021/0342552 | A1 | 11/2021 | Mishra et al. | |
| 2022/0138239 | A1 | 5/2022 | Saito et al. | |
| 2022/0366155 | A1 | 11/2022 | Morishita et al. | |
| 2023/0025317 | A1 | 1/2023 | Miao | |
| 2023/0177110 | A1* | 6/2023 | Nagalapatti | G06F 18/2431<br>382/159 |
| 2023/0206055 | A1* | 6/2023 | Tetelman | G06N 3/088<br>706/15 |
| 2023/0222180 | A1* | 7/2023 | Groh | G06F 18/22<br>706/12 |
| 2023/0230484 | A1* | 7/2023 | Al Faruque | G06V 10/82 |
| 2024/0135246 | A1* | 4/2024 | Miyamoto | G06N 3/006 |

OTHER PUBLICATIONS

Rácz, Anita, Dávid Bajusz, and Károly Héberger. "Effect of dataset size and train/test split ratios in QSAR/QSPR multiclass classification. " Molecules 26.4 (2021): 1111. (Year: 2021).*

Bayer, M., Kaufhold, M. A., Buchhold, B., Keller, M., Dallmeyer, J., & Reuter, C. (2021). Data Augmentation in Natural Language Processing: A Novel Text Generation Approach for Long and Short Text Classifiers. arXiv preprint arXiv:2103.14453. (Year: 2021).

Regina, M., Meyer, M., & Goutal, S. (2020). Text data augmentation: Towards better detection of spear-phishing emails. arXiv preprint arXiv:2007.02033. (Year: 2020).

Shyang, Y. K., & Yan, J. L. S. (Sep. 2020). A text augmentation approach using similarity measures based on neural sentence embeddings for emotion classification on microblogs. In 2020 IEEE 2nd International Conference on Artificial Intelligence in Engineering and Technology (IICAIET) (pp. 1-6). (Year: 2020).

Zhao, W., Peyrard, M., Liu, F., Gao, Y., Meyer, C. M., & Eger, S. (2019). MoverScore: Text generation evaluating with contextualized embeddings and earth mover distance. arXiv preprint arXiv: 1909.02622. (Year: 2019).

"Diverse Data Augmentation via Unscrambling Text with Missing Words," Anonymous EMNLP submission, pp. 1-11.

Alishahi, A., et al., "Analyzing and Interpreting Neural Networks for NLP: A Report on the First BlackboxNLP Workshop," Natural Language Engineering, vol. 25, Issue 4, Jul. 2019, pp. 19.

Alzantot, M., et al., "Generating Natural Language Adversarial Examples," Proceedings of the 2018 Conference on Empirical Methods in Natural Language Processing, Oct.-Nov. 2018, pp. 9.

Casanueva, I., et al., "Efficient Intent Detection with Dual Sentence Encoders," Proceedings of the 2nd Workshop on Natural Language Processing for Conversational AI, Jul. 9, 2020, pp. 38-45.

Coucke, A., et al., "Snips Voice Platform: an embedded Spoken Language Understanding system for private-by-design voice interfaces," May 2018, pp. 29.

Devlin et al., "BERT: Pre-training of deep bidirectional transformers for language understanding," In Proceedings of the 2019 Conference of the North American Chapter of the Association for Computational Linguistics, 2019, pp. 4171-4186.

Gardner, M., et al., "Evaluating Models' Local Decision Boundaries via Contrast Sets," Findings of the Association for Computational Linguistics: EMNLP 2020, Jan. 2020, pp. 17.

Gu, J., et al., "Search engine guided neural machine translation," In Thirty-Second AAAI Conference on Artificial Intelligence, Apr. 27, 2018, pp. 5133-5140.

Han, X., et al., "Explaining black box predictions and unveiling data artifacts through influence functions," Proceedings of the 58th Annual Meeting of the Association for Computational Linguistics, Jul. 5-10, 2020, pp. 5553-5563.

Jia, R., et al., "Adversarial Examples for Evaluating Reading Comprehension Systems," Proceedings of the 2017 Conference on Empirical Methods in Natural Language Processing, Sep. 2017, pp. 2021-2031.

Kaushik, D., et al., "Learning the difference that makes a difference with counterfactually-augmented data," In International Conference on Learning Representations, 2020, pp. 17.

Khandelwal, U., et al., "Generalization through memorization: Nearest neighbor language models," ICLR, 2020, pp. 13.

Kobayashi, S., et al., "Contextual Augmentation: Data Augmentation byWords with Paradigmatic Relations," Proceedings of NAACL-HLT, Jun. 1-6, 2018, pp. 452-457.

Koh, P.W. et al., "Understanding black-box predictions via influence functions," In Proceedings of the 34th International Conference on Machine Learning, vol. 70, Mar. 14, 2017. pp. 1885-1894.

Larson, S., et al., "An evaluation dataset for intent classification and out-of-scope prediction," In Proceedings of the 2019 Conference on Empirical Methods in Natural Language Processing and the 9th International Joint Conference on Natural Language Processing (EMNLP-IJCNLP), Nov. 3-7, 2019, pp. 1311-1316.

Lee, K., et al., "Neural Data Augmentation via Example Extrapolation," Cornell University. Feb. 2, 2021, pp. 14.

Li, C., et al., "Linguistically-Informed Transformations (LIT ): A Method for Automatically Generating Contrast Sets," Proceedings of the Third BlackboxNLP Workshop on Analyzing and Interpreting Neural Networks for NLP, Nov. 20, 2020, pp. 126-135.

Mccoy, R.T., et al., "Right for the wrong reasons: Diagnosing syntactic heuristics in natural language inference," Proceedings of the 57th Annual Meeting of the Association for Computational Linguistics, Jul. 28-Aug. 2, 2019, pp. 3428-3448.

Min, J., et al., "Syntactic Data Augmentation Increases Robustness to Inference Heuristics," Proceedings of the 58th Annual Meeting of the Association for Computational Linguistics, Jul. 5-10, 2020, pp. 2339-2352.

Rajani, N, F., et al., "Explaining and Improving Model Behavior with k Nearest Neighbor Representations," Oct. 2020, pp. 9.

Ribeiro et al., "Semantically Equivalent Adversarial Rules for Debugging NLP Models", In Proceedings of the 56th Annual Meeting of the Association for Computational Linguistics (vol. 1: Long Papers), 2018, pp. 856-865.

Ribeiro, M., et al., "Beyond Accuracy: Behavioral Testing of NLP Models with CheckList," Proceedings of the 58th Annual Meeting of the Association for Computational Linguistics, Jul. 5-10, 2020, pp. 4902-4912.

Weston, J., et al., "Retrieve and refine: Improved sequence generation models for dialogue," Proceedings of the 2018 EMNLP Workshop SCAI: The 2nd Int'l Workshop on Search-Oriented Conversational AI, Oct. 31, 2018, pp. 87-92.

Wiseman, S., "Label-Agnostic Sequence Labeling by Copying Nearest Neighbors, " Proceedings of the 57th Annual Meeting of the Association for Computational Linguistics,Jul. 28-Aug. 2, 2019, pp. 5363-5369.

(56) References Cited

OTHER PUBLICATIONS

Wolf, T., et al., "Huggingface's transformers: State-of-the-art natural language processing," Proceedings of the 2020 EMNLP, Nov. 16-20, 2020, pp. 38-45.
Zhang, J., et al., "Guiding Neural Machine Translation with Retrieved Translation Pieces," NAACL, 2018, pp. 11.
Garg, S., & Ramakrishnan, G. (2020). Bae: Bert-based adversarial examples for text classification. arXiv preprint arXiv:2004.01970. (Year: 2020).
Kumar, V., Choudhary, A., & Cho, E. (2020). Data augmentation using pre-trained transformer models. arXiv preprint arXiv: 2003.02245. (Year: 2020).
Liu, P., Wang, X., Xiang, C., & Meng, W. (Aug. 2020). A survey of text data augmentation. In 2020 International Conference on Computer Communication and Network Security (CCNS) (pp. 191-195). IEEE. (Year: 2020).
Palomino, D., & Luna, J. O. (2020). Palomino-Ochoa at TASS 2020: Transformer-based Data Augmentation for Overcoming Few-Shot Learning. In IberLEF@SEPLN (pp. 171-178). (Year: 2020).
Wu, X., Lv, S., Zang, L., Han, J., & Hu, S. (2019). Conditional bert contextual augmentation. In Computational Science—ICCS 2019: 19th International Conference, Faro, Portugal, Jun. 12-14, 2019, Proceedings, Part IV 19 (pp. 84-95). (Year: 2019).
Li, D., Zhang, Y., Peng, H., Chen, L., Brockett, C., Sun, M. T., & Dolan, B. (2020). Contextualized perturbation for textual adversarial attack. arXiv preprint arXiv:2009.07502. (Year: 2020).
Nie, W., Narodytska, N., & Patel, A. (Sep. 2018). Relgan: Relational generative adversarial networks for text generation. In International conference on learning representations. (Year: 2018).
Sellam, T., Das, D., & Parikh, A. P. (2020). BLEURT: Learning robust metrics for text generation. arXiv preprint arXiv:2004.04696. (Year: 2020).
Xu, J., Ren, X., Lin, J., & Sun, X. (2018). Diversity-promoting GAN: A cross-entropy based generative adversarial network for diversified text generation. In Proceedings of the 2018 conference on empirical methods in natural language processing (pp. 3940-3949). (Year: 2018).
Zhang, T., Kishore, V., Wu, F., Weinberger, K. Q., & Artzi, Y. (2019). Bertscore: Evaluating text generation with bert. arXiv preprint arXiv: 1904.09675. (Year: 2019).
Zhou, W., Ge, T., Xu, C., Xu, K., & Wei, F. (2021). Improving sequence-to-sequence pre-training via sequence span rewriting. arXiv preprint arXiv:2101.00416. (Year: 2021).
Guu K. et al., "Generating Sentences by Editing Prototypes", Transactions of the Association for Computational Linguistics, 2018, pp. 14.
Lai Ivan, "Conditional Text Generation by Fine Tuning GPT-2", Retrieved from https://towardsdatascience.com/conditional-text-generation-by-fine-tuning-gpt-2-11c1a9fc639d, Jan. 27, pp. 1-9.
Uchimoto K. et al., "Text generation from keywords", Proceedings of the 19th international conference on Computational linguistics, 2002, vol. 1, pp. 7.
Bieck et al., "Generation of surgical reports using keyword-augmented next sequence prediction", Current Directions in Biomedical Engineering, 2021, vol. 7, No. 2, pp. 387-390.
Chan et al., "CoCon: A Self-Supervised Approach for Controlled Text Generation", Jun. 10, 2022, pp. 1-21.

* cited by examiner

AUGMENTING DATA SETS FOR SELECTING MACHINE LEARNING MODELS

INCORPORATION BY REFERENCE; DISCLAIMER

The following application is hereby incorporated by reference: U.S. Provisional Patent Application 63/352,103, filed Jun. 14, 2022, and U.S. Non-Provisional Application Ser. No. 17/903,798, filed on Sep. 6, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to machine learning models. More specifically, the present disclosure relates to partitioning sample data points and synthetic data for using in the training and validation of machine learning models.

BACKGROUND

Machine learning systems train models to output predictions based on sample data sets. The accuracy of the machine learning models depends on the quantity and quality of the sample data sets. For example, machine learning models trained using sample data sets having few example data points in one or more classes, or a lacking variation among the data points included in a particular class, are likely to be inaccurate. As such, the accuracy of a machine learning model can be improved by obtaining sample data sets including a large number of diverse examples. However, in some situations, obtaining sample data sets having sufficient size and diversity can be challenging.

The approaches described in this Background section are ones that could be pursued, but not necessarily approaches that have been previously conceived or pursued. Unless otherwise indicated, it should not be assumed that any of the approaches described in this section qualify as prior art.

DETAILED DESCRIPTION

Figure 1:
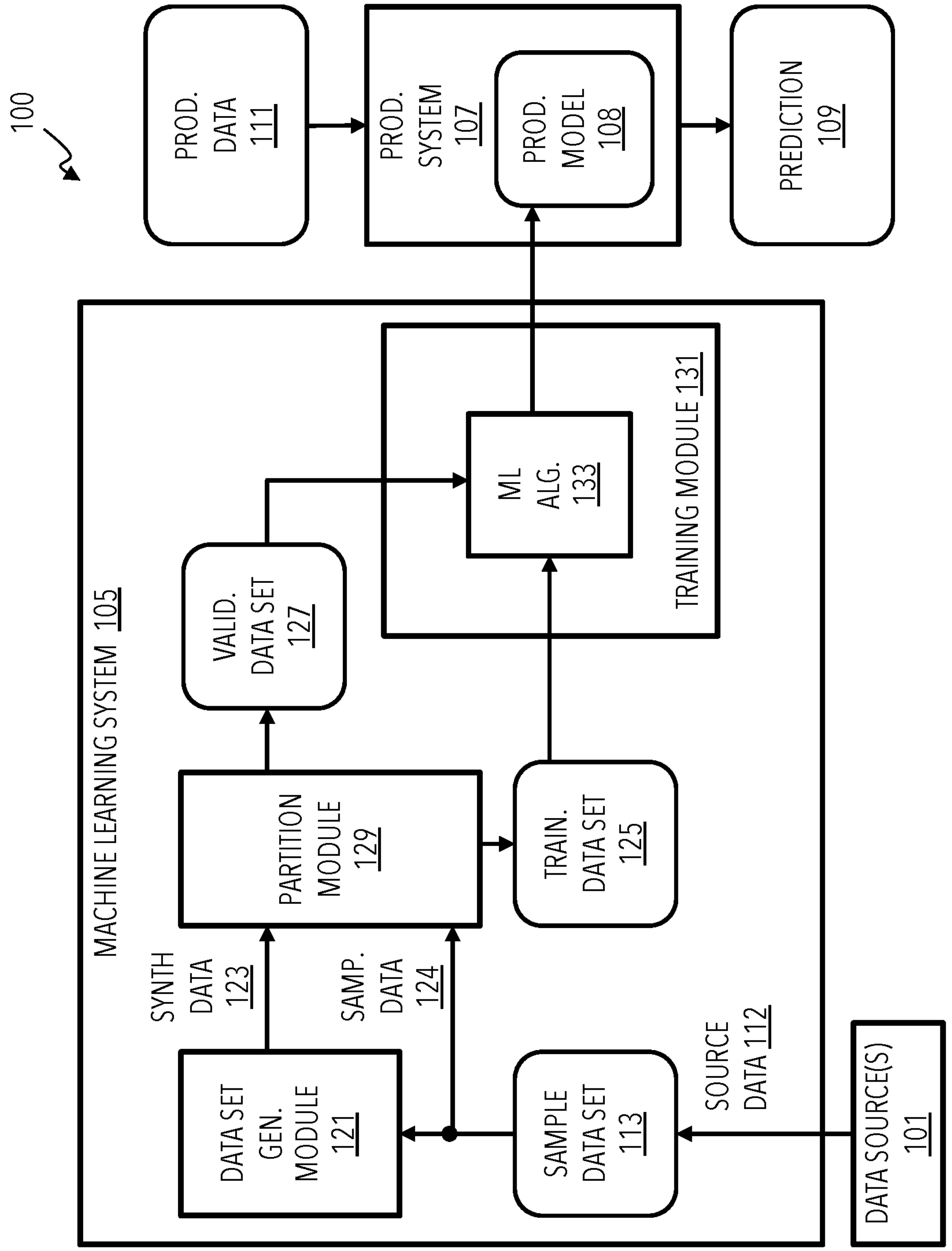
FIG. 1 illustrates a functional flow block diagram of an example system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:

A. GENERAL OVERVIEW
B. DATA AUGMENTATION PROCESS FLOW
C. DATA AUGMENTATION SYSTEM ARCHITECTURE
D. TRAINING AND VALIDATING A MACHINE LEARNING MODEL USING A COMBINATION OF SAMPLE DATA POINTS AND SYNTHETIC DATA POINTS
E. COMPUTER NETWORKS AND CLOUD NETWORKS
F. MISCELLANEOUS; EXTENSIONS
G. HARDWARE OVERVIEW

A. General Overview

Systems, methods, and computer-readable media disclosed herein train and/or validate a machine learning model using synthesized data points to augment a sample data set. In accordance with aspects of the present disclosure, a data generation module generates the synthesized data points using the sample data set. One or more embodiments selectively partition the data points included in the sample data set and the synthesized data points into training data and validation data, which are used to generate and select machine learning models. For example, the training data can train parameters of machine learning models having different hyperparameters. During the course of the training, the validation data can be used to identify a best machine learning model with respect to all hyperparameters and training epochs.

One or more embodiments disclosed herein optimize machine learning in few-shot situations. A few-shot situation occurs when data points in some or all classes of a sample data set are scarce. Scarcity of data points makes determination of an accurate machine learning model difficult due to a low quantity of examples available for training and validation of the model. Reducing the quantity of data points can exacerbate the issue. For example, allocating a portion of the sample points for use in validation of a machine learning model (e.g., 80% of the data for training and 20% for validation) can lead to misleading validation results due to the few examples available. Additionally, allocating a substantial percentage of the sample data points to validation can cause training to suffer from an insufficient quantity of examples. Accordingly, one or more embodiments synthesize data points for training and validation of a machine learning model. The sample data and the synthesized data can be selectively partitioned between training data and validation data based on characteristics of the sample data set, such as quantity and diversity of the samples. In one or more embodiments, the partitioning allocates substantially all the sample data points for training and allocates substantially all the synthetic data points for validation. Further, in one or more embodiments, the partitioning solely allocates the sample data points for training data and solely allocates the synthetic data points for validation.

While this General Overview subsection describes various example embodiments, it should be understood that one or more embodiments described in this Specification or recited in the claims may not be included in this subsection.

B. Data Augmentation Process Flow

FIG. 1 shows a functional block diagram illustrating an example process flow 100 of an example system for augmenting machine learning data in accordance with one or more embodiments. The process flow 100 includes a data source 101, a machine learning system 105, and a production system 107. The data source 101 can be one or more public, commercial, proprietary, or special-purpose data repository. For example, the data source 101 can be a machine learning library, such as COMMONCRAWL, WIKIPEDIA®, KAGGLE, and the UCI MACHINE LEARNING REPOSITORY. The data source 101 can also be a database of information maintained by an information management system. For example, a customer management application can maintain a database of transcribed conversations between customers and service representatives. Further, the data source 101 can be a data acquisition system that stores information from sensors. For example, a security system may generate and store image data and metadata describing the images (e.g., time, data, location, events, etc.).

As described below, the machine learning system 105 can be one or more computing systems configured to process data from the data source 101 to train and select a production model 108 for processing by the production system 107. The production system 107 can be one or more computing systems configured to generate a prediction 109 from production data 111 using the machine learning production model 108 determined by the machine learning system 105. For example, the production model 108 can be a machine learning model for a digital assistant. The production data 111 can be a natural language query from a user to the digital assistant. And the predictions 109 can be an output of the production model 108 responding to the query based on a classification of the user's intent.

The process flow 100 includes the machine learning system 105 obtaining source data 112 from the data source 101. The source data 112 obtained can depend on the purpose of the machine learning model. For example, a text classification model can be trained to function as a chatbot for customer service using source data 112 from several sources, including customer service logs of online chats between customers and service representatives. In accordance with one or more embodiments disclosed herein, the source data 112 can be few-shot data. For example, the source data 112 may include only a few example data points in one or more classes. In some implementations the few-shot source data 112 can have five or fewer data points per class. In some other examples, the few-shot source data 112 can have ten or fewer data points per class. In some other examples, the few-shot source data 112 can have fewer than 1,000 total data points. In some other examples, the few-shot source data 112 can have fewer than 500 total data points.

The process flow 100 illustrated in FIG. 1 includes constructing a sample data set 113 from the source data 112. Constructing the sample data set 113 can include cleaning the source data 112. Some embodiments of the source data 112 can be raw data, which may include missing, noisy, or inconsistent information. For example, missing data can occur when a data log is continuously created, or portions become corrupted. Noisy data can include information that is significantly different from other information in the set due to error, an unusual event, or the like. Inconsistent data can result from mistakes or duplication of data. Cleaning the raw data can include converting the information, which may be image, categorical, or ordinal data, into numeric data. Cleaning the source data 112 can also include ignoring missing values, for example, by removing irrelevant information included in the source data 112. Additionally, cleaning the source data 112 can include filling in missing information by estimating values. For example, the process flow 100 can estimate values by determining mean, median, or highest frequency values. Moreover, cleaning the source data 112 can include detecting and removing outliers that drastically deviates from other observations. For example, among a set of features whose values have a median of 16, an outlier value may be 1000.

The example process flow 100 further includes generating synthetic data points 123 from sample data points 124 of the sample data set 113. One or more embodiments of the machine learning system 105 include a data set generation module 121 configured to determine the synthetic data points 123. The data set generation module 121 can be a machine learning module trained to generate the synthetic data points 123 from the sample data points 124. The data set generation module 121 can use different data augmentation techniques to generate synthetic data points 123 that reflecting the properties of the original sample data points 124. Example data augmentation techniques can include generative adversarial networks (GANs), which use algorithms that learn patterns from input data sets and automatically create new examples resemble training data. Example data augmentation techniques can also include adversarial machine learning, which generates examples that disrupt a machine learning model and injects them into training data sets. Example data augmentation techniques can further include neural style transfer, which blend content image and style image and separate style from content. Additionally, example data augmentation techniques can include drawing numbers from a distribution by observing real statistical distributions and reproducing synthetic data. This technique also includes the creation of generative models. It is understood that existing data augmentation software, such as CARLA and AUGLY, can be used to generate the synthetic data points 123.

Additionally, the process flow 100 includes selectively partitioning the sample data points 124 and the synthetic data points 123 into a training data set 125 and validation data set 127. The training data set 125 can be information on which the machine learning system 105 trains a machine learning model (e.g., production model 108) using a machine learning algorithm 133. For example, based on the training data set 125, a machine learning model can learn parameters of a classifier. The validation data set 127 can be used estimate the skill of trained machine learning model on unseen data (e.g., data not used for training) partitioned from the training data and used to tune the parameters of a classifier. One or more embodiments of the machine learning system 105 include a partition module 129 configured to selectively partition the sample data set 113 and the synthetic data points 123 based on characteristics of the sample data, such as quantity and variation among the sample data as a whole and among individual classes of the data. Some embodiments partition substantially all the sample data points 124 into the training data set 125 and the synthetic data points 123 into the validation set 127. Some embodiments of the partition module 129 partition all of the sample data points 124 into the training data set 125 and partition all of the synthetic data 123 into the validation data set 127.

Also, the process flow 100 includes determining the production model 108 by training and selecting machine learning models using the training data set 125, the validation data set 127, and the testing data set 115. Embodiments of the machine learning system 105 include a training module 131 that trains a machine learning algorithm 133 using the training data set 125 and validates the resulting machine learning models using the validation data set 127. Prior to training, a user selects hyperparameters that control the training process. Hyperparameters can be, for example, a learning rate, batch size, and a weight decay. Using selected hyperparameters, the training module 131 trains machine learning models by fitting trainable parameters of the algorithm 133 to the training data set 125. In some embodiments, the training algorithm 133 can be a classification algorithm, such as K-Nearest Neighbor, Naive Bayes, Random Forest, Support Vector Machine, and Logistic Regression. The training algorithm can also be a regression algorithm, such as Linear Regression, Support Vector Regression, Decision Tress/Random Forest, and Gaussian Progresses Regression. During training, weights of the algorithm 133 are optimized by minimizing loss, as defined by a loss function.

The training module 131 can be configured to identify one of the machine learning models generated from the machine learning algorithm 133 that best represents the training data set 125 and how well the model will work in the production settings. For example, at regular intervals, the training module 131 evaluates the machine learning module using the validation data set 127 and scores its performance. Scoring can include one or more of accuracy, precision, recall F1 score, specificity, mean squared error (MSE), root mean squared error (RMSE), mean absolute error (MAE), or other suitable evaluation methods. Model training and evaluation may be repeated an arbitrary number of times with different settings of the hyperparameters. Based on the one or more evaluations, a machine learning model having the best performance on the validation set (e.g., the set of hyperparameters that led to the best outcome) is deployed as the production model 108. The production model 108 can be used to determine predictions 109 based on production data 111. For example, the production model 108 can predict the content of image recorded by a fielded security system.

C. Data Augmentation System Architecture

Figure 2:
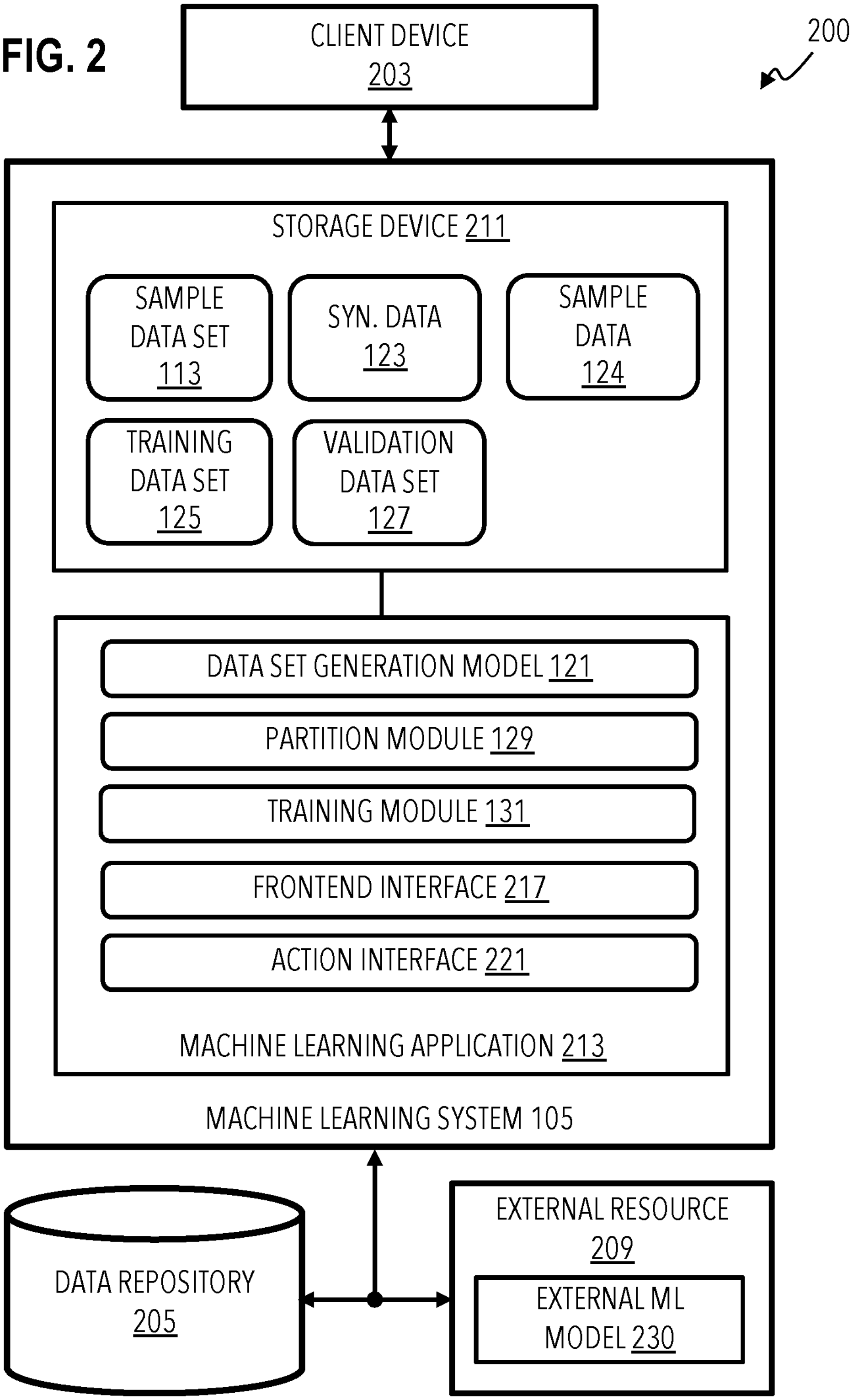
FIG. 2 illustrates a block diagram of an example system in accordance with one or more embodiments.

FIG. 2 illustrates a system 200 in accordance with one or more embodiments. As illustrated in FIG. 2, system 200 includes a machine learning system 105, client device 203, a data repository 205, and external resource 209. The machine learning system 105 can be the same or similar to that previously described herein. In one or more embodiments, the system 200 include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

The client device 203 may be a web browser, a mobile application, or other software application communicatively coupled to a network (e.g., via a computing device). The client device 203 may interact with other elements of the system 200 directly or via cloud services using one or more communication protocols, such as HTTP and/or other communication protocols of the Internet Protocol (IP) suite. In some examples, the client device 203 is configured to receive and/or generate data items that are stored in the data repository 205. The client device 203 may transmit target data items (e.g., source data 112) to the machine learning system 105 for analysis. In some examples, the client device 203 may send instructions to the machine learning system 105 that initiate processes to generate synthetic data points 123 from sample data points 124 for one or more machine learning models, as described below.

The client device 203 may also include a user input/output device configured to render a graphic user interface (GUI) generated by the machine learning system 105. The GUI may present an interface by which a user triggers execution of computing transactions, thereby generating and/or analyzing data items. In some examples, the GUI may include features that enable a user to view training data, classify training data, instruct the machine learning system 105 to execute processes to augment or otherwise increase a number of examples in a training data set, and other features of embodiments described herein. Furthermore, the client device 203 may be configured to enable a user to communicate user feedback via a GUI regarding the accuracy of the machine learning system 105 analysis. That is, a user may label, using a GUI, an analysis generated by the machine learning system 105 as accurate or not accurate. In some examples, using a GUI, the user may cause execution of operations (e.g., a loss function analysis) that measure a degree of accuracy of the analysis produced by the machine learning system 105. These latter features enable a user to label or otherwise "grade" data analyzed by the machine learning system 105 so that the machine learning system 105 may update its training.

In one or more embodiments, the data repository 122 may be any type of storage unit and/or device (e.g., a file system, database, collection of tables, or any other storage mechanism) for storing data. Further, data repository 122 may each include multiple different storage units and/or devices. The multiple different storage units and/or devices may or may not be of the same type or located at the same physical site. Further, data repository 122 may be implemented or may execute on the same computing system as the machine learning application 213. Alternatively, or additionally, data repository 122 may be implemented or executed on a computing system separate from the machine learning application 213. Data repository 122 may be communicatively coupled to the machine learning application 213 via a direct connection or via a network.

Some embodiments of the machine learning system 105 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The machine learning system 105 illustrated in FIG. 2 includes a storage device 211 and a machine learning application 213. The storage device 211 can include hard disk drives, flash drives, a compact disk ROM, a digital versatile disk (DVD) optical storage technology, or suitable other fixed, non-transitory computer-readable storage devices. The storage device 211 can store program instructions (e.g., program code) and operational data for the operation of the machine learning system 105. Further, the storage device 211 can store sample data set 113, synthetic data points 123, sample data points 124, training data set 125, and validation data set 127, which can all be the same or similar to that previously described. It is understood that some or all of the information used by the machine learning system can be stored remotely, such as in the data repository 205

The machine learning application 213 can include a data set generation module 121, a partition module 129, and a training module 131, which can all be the same or similar to those previously described. Additionally, the machine learning system 105 can include a frontend interface 217 and an action interface 221. Embodiments of the training module 131 use training data set 125 to train one or more machine learning models, as described below. In one or more examples, the training data set 125 can be comprised solely of sample data points 124 from the sample data set 113 or it can be a combination of sample data points 124 and the synthetic data points 123. Also, in one or more examples, the training data set 125 is comprised entirely of sample data points 124 and excludes any synthetic data points 123.

In some examples, data set generation model 121 may include one or both of supervised machine learning algorithms and unsupervised machine learning algorithms. In some examples, any one or more of the machine learning models of the system 200 may be embodied by linear regression, logistic regression, linear discriminant analysis, classification and regression trees, naïve Bayes, k-nearest neighbors, learning vector quantization, support vector machine, bagging and random forest, boosting, back propagation, neural network, and/or clustering models. In some examples, multiple trained machine learning models of the same or different types may be arranged in a machine learning “pipeline” so that the output of a prior model is processed by the operations of a subsequent model. In various examples, these different types of machine learning algorithms may be arranged serially (e.g., one model further processing an output of a preceding model), in parallel (e.g., two or more different models further processing an output of a preceding model), or both. In addition to the specific machine learning models described above, any one or more of the machine learning models of the system 200 may include any of a number of different types of machine learning models that have been adapted to execute the operations described below.

The frontend interface 217 manages interactions between the client device 203 and the machine learning application 213. In one or more embodiments, frontend interface 217 refers to hardware and/or software configured to facilitate communications between a user and the clients 102A,102B and/or the machine learning application 213. In some embodiments, frontend interface 217 is a presentation tier in a multitier application. Frontend interface 217 may process requests received from clients and translate results from other application tiers into a format that may be understood or processed by the clients. For example, the client device 203 may submit requests to the machine learning application 213 via the frontend interface 217 to perform various functions, such as for labeling training data and/or analyzing target data. In some examples, one or both of the client device 203 may submit requests to the machine learning application 213 via the frontend interface 217 to view a graphic user interface related to natural language processing analysis. In still further examples, the frontend interface 217 may receive user input that re-orders individual interface elements.

Frontend interface 217 refers to hardware and/or software that may be configured to render user interface elements and receive input via user interface elements. For example, frontend interface 217 may generate webpages and/or other graphical user interface (GUI) objects. Client applications, such as web browsers, may access and render interactive displays in accordance with protocols of the internet protocol (IP) suite. Additionally or alternatively, frontend interface 217 may include other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 217 are specified in different languages. The behavior of user interface elements is specified in a dynamic programming language, such as JavaScript. The content of user interface elements is specified in a markup language, such as hypertext markup language (HTmachine learning) or Xmachine learning User Interface Language (XUL). The layout of user interface elements is specified in a style sheet language, such as Cascading Style Sheets (CSS). Alternatively, the frontend interface 217 is specified in one or more other languages, such as Java, C, or C++.

The action interface 221 may include an API, CLI, or other interfaces for invoking functions to execute actions. One or more of these functions may be communicated through cloud services or other applications, which may be external to the machine learning application 213. For example, one or more components of machine learning application 213 may invoke an API to access information stored in a data repository (e.g., data repository 122) for use as a training corpus for the machine learning (machine learning) application 104. It will be appreciated that the actions that are performed may vary from implementation to implementation.

In some embodiments, the machine learning application 213 may access external resources 126, such as cloud services. Example cloud services may include, but are not limited to, social media platforms, email services, short messaging services, enterprise management systems, and other cloud applications. Additional embodiments and/or examples relating to computer networks are described the section below, titled “Computer Networks and Cloud Networks.”

In some examples, the external resource 209 may include an external machine learning model 230 that is trained using the training data set 125 generated by the machine learning application 213. In one example, training data sets generated by the machine learning application 213 may be used to train a user-facing natural language processing applications, such as a chatbot (for instant text communications) or an interactive voice recognition (IVR) system.

Figure 3A:
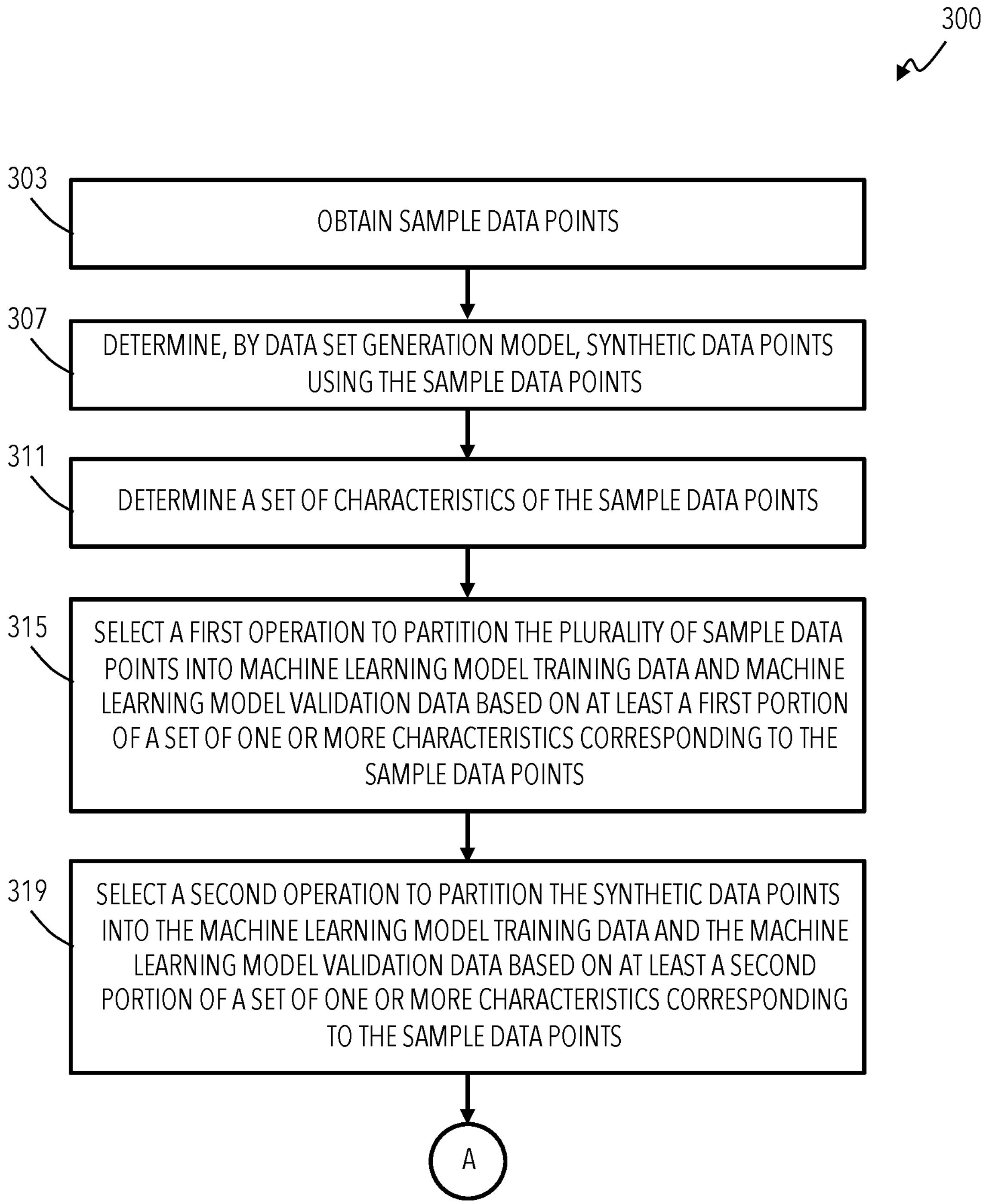
FIGS. 3A and 3B illustrate a set of operations of an example process for augmenting existing data set for training and validating a machine learning model in accordance with one or more embodiments.
Figure 3B:
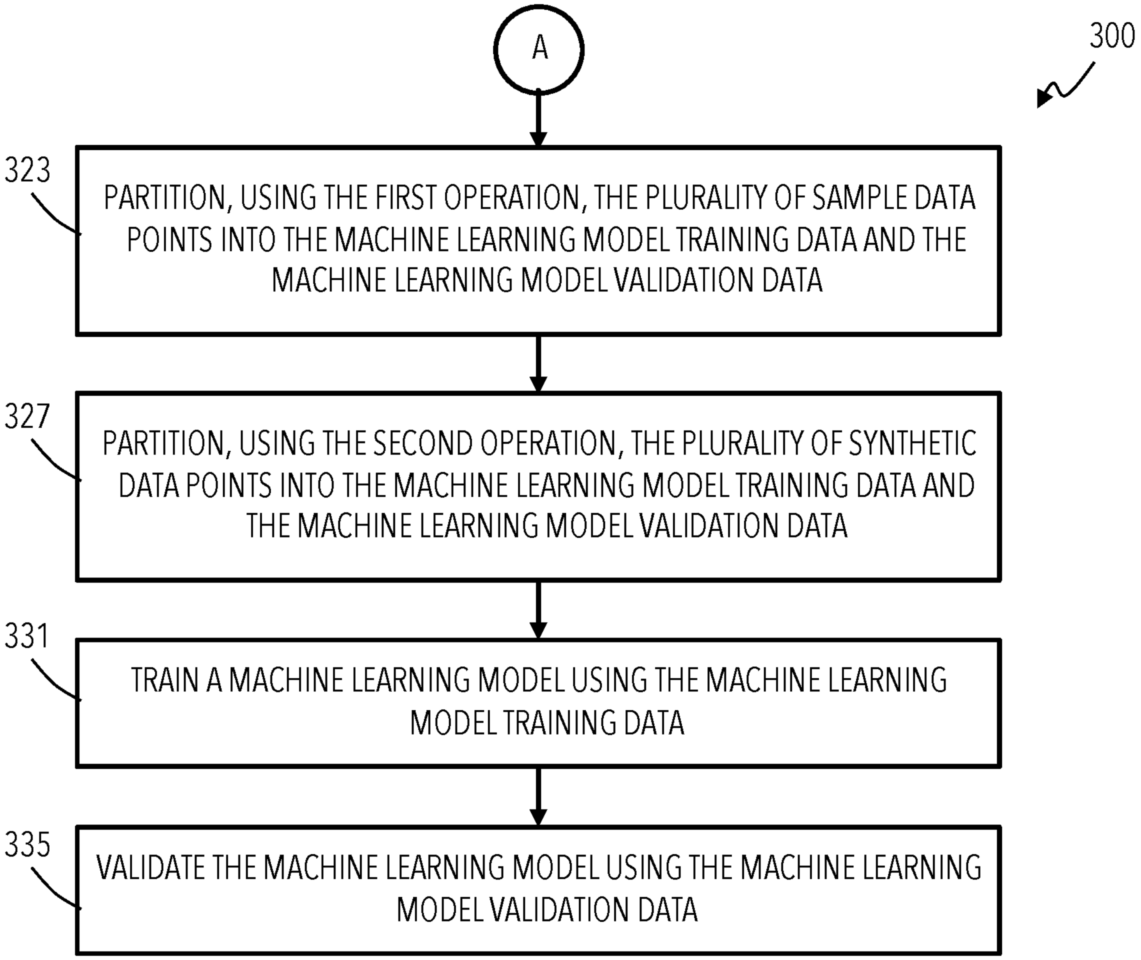

D. Training and Validating a Machine Learning Model Using a Combination of Sample Data Points and Synthetic Data Points The flow diagrams in FIGS. 3A and 3B illustrate functionality and operations of systems, devices, processes, and computer program products according to various implementations of the present disclosure. Each block in FIGS. 3A and 3B can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A and 3B. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIG. 3 illustrates a process 300 in accordance with one or more embodiments. At block 303, the process 300 obtains sample data points (e.g., sample data points 124 of sample data set 113). As previously described herein, one or more data sources (e.g., data sources 101) can provision the sample data. In some examples, the sample data set can include image data, conversational data, product data, spam, malware data, and so on. In accordance with aspects of the present disclosure, the sample data set can be small. For example, the sample data set can include few-shot data set.

At block 307, the process 300 determines synthetic data points (e.g., synthetic data points 123) using the sample data points obtained at block 303. One or more embodiments determine the synthetic data points using data augmentation techniques to create new data similar to the sample data. Any augmentation technique may be used. Some embodiments use generative augmentation methods. For example, a data set generator (e.g., data set generator module 121) can processes sample data points to produce the synthetic data points (e.g., synthetic data points 123). In some implementations, a data augmentation function g(x, q) takes a training example (x) from the sample data (D) and optionally takes some side information (q) to determine the synthetic data points. In a non-limiting example, data augmentation can include a sequence to sequence ("seq2seq") model that receives an input set of words in a first sequence and then generates a grammatically correct sentence using the words in the input set that are arranged in a second sequence. One example embodiment of a sequence to sequence that may be used in this context is the "T5" pre-trained sequence to sequence model. T5 is an encoder-decoder model pre-trained on a multi-task mixture of unsupervised and supervised tasks and for which each task is converted into a text-to-text format. Other embodiments may engage other types of natural language processing models or trained machine learning models. In some implementations, data set generator generates 20 synthetic data points for the class labels the sample data set. It is that the number of synthetic data points per class larger or smaller.

At block 311, the process determines a set of characteristics of the sample data points obtained at block 303. Some embodiments characterize the quantity and quality of the sample data points. The characterization of the quantity can be a categorization of the quantity of data. For example, sample data including less than 5 examples or less than 10 examples in a class can be categorized as few-shot data. Additionally, a sample data set including less than 500 total examples or less than 1,000 total examples in a class can be categorized as few-shot data. The characterization of the quantity can also categorize the variation among the data. For example, variation categorization can include, for the sample data or classes of the sample data, estimating statistical differences among the data such as variance with respect to a mean of the data.

At block 315, the process 300 (e.g., machine learning system 105 executing partition module 129), selects a first operation to partition the sample data points into training data and validation data based on at least a first portion of one or more characteristics corresponding to the sample data points determined at block 311. Example characteristics can include quantity or variation of data points included in the sample data set or of data points within classes of the sample data set. One or more embodiments of the first operation partitions of the sample data points based on a comparison of the quantity of data points to one or more threshold values. For example, for a sample data set including more than 1000 data points, the first operation can partition 80% of the sample data to the training data se and 20% of the sample data to the validation data set. For a sample data set including less than 1000 data points, but more than 100 data points, the first operation can allocate 90% of the sample data to the training data set and 10% of the sample data to the validation data set. For a sample data set including 100 or less data points, the first operation can allocate 100% of the sample data to the training data set and none of the sample data to the validation data set.

At block 319, the process 300 (e.g., machine learning system 105 executing partition module 129) selects a second operation to partition the synthetic data points into the training data and the validation data based on at least a second portion of a set of the one or more characteristics corresponding to the synthetic data points determined at block 311. For example, for a sample data set including more than 1000 data points, the second operation can partition 80% of the sample data to the validation data set and 20% of the sample data to the training data set. For a sample data set including less than 1000 data points, but more than 100 data points, the second operation can allocate 90% of the sample data to the validation data set and 10% of the sample data to the training data set. For a sample data set including 100 or less data points, the second operation can allocate 100% of the sample data to the validation data set and none of the sample data to the training data set.

As described above, both the first operation for partitioning sample data points and the second operation for partitioning synthetic data points may be selected based on the characteristics corresponding to the sample data points. In an alternate embodiment, only one of the first operation and the second operation is selected based on the characteristics corresponding to the sample data points. The other operation, that is not being selected based on the characteristics of the sample data points, may instead be selected based on other criteria. In one example, the operation to partition to sample data points may be selected based on the characteristics of the sample data points. The operation to partition the synthetic data points may be selected based on how the sample data points have been partitioned. Alternatively, the synthetic data points may be partitioned using a default operation where the synthetic data points are simply split equally across the training data and validation data.

Continuing to FIG. 3B, as indicated by off-page connector "A," at block 323, the process 300 (e.g., machine learning system 105 executing partition module 129) partitions, using the first operation selected at block 315, the plurality of sample data points into the machine learning model training data and the machine learning model validation data. At block 327, the process 300 (e.g., machine learning system 105 executing partition module 129) partitions, using the second operation selected at block 319, the plurality of synthetic data points into the training data and validation data.

At block 331, the process 300 (e.g., machine learning system 105 executing training module 131), trains a machine learning model using the machine learning model training data partitioned at blocks 323 and 327. In embodiments, a machine learning module (e.g., training module 131) trains the machine learning module using a training function (e.g., machine learning algorithm 133) and model evaluator (e.g., evaluation module 135), as previously described herein. In one or more examples, a training function (f) can take hyperparameters (H), trainable parameters (W), training data (D), and a loss function (L) and minimize the loss function with respect to the trainable parameters and the training data. That is, machine learning module can train various models for multiple collections of hyperparameters, by computing, for example, {f(H_0, W, D, L), f(H_1, W, D, L), . . . , f(H_n, W, D L)}, where H_k is a single set of hyperparameters. At block 331, the process 300 (e.g., machine learning system 105 executing training module 131), validates the machine learning model using the machine learning model validation data partitioned at blocks 323 and 327. For example, embodiments perform model selection by evaluating all models on the generated data, Z, and returning the best performing model. For example, argmax {J(M_0, Z), J(M_1, Z), . . . , J(M_n, Z)}, where M_0 is the model trained with hyperparameters H_0.

Using the process 300 to increase a diversity of examples in a training data set has the added benefit of efficiency because the diverse samples are based on an already existing training data set. The additional effort (computational or otherwise) needed for obtaining, filtering, and classifying an entirely new and distinct data set is avoided.

E. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
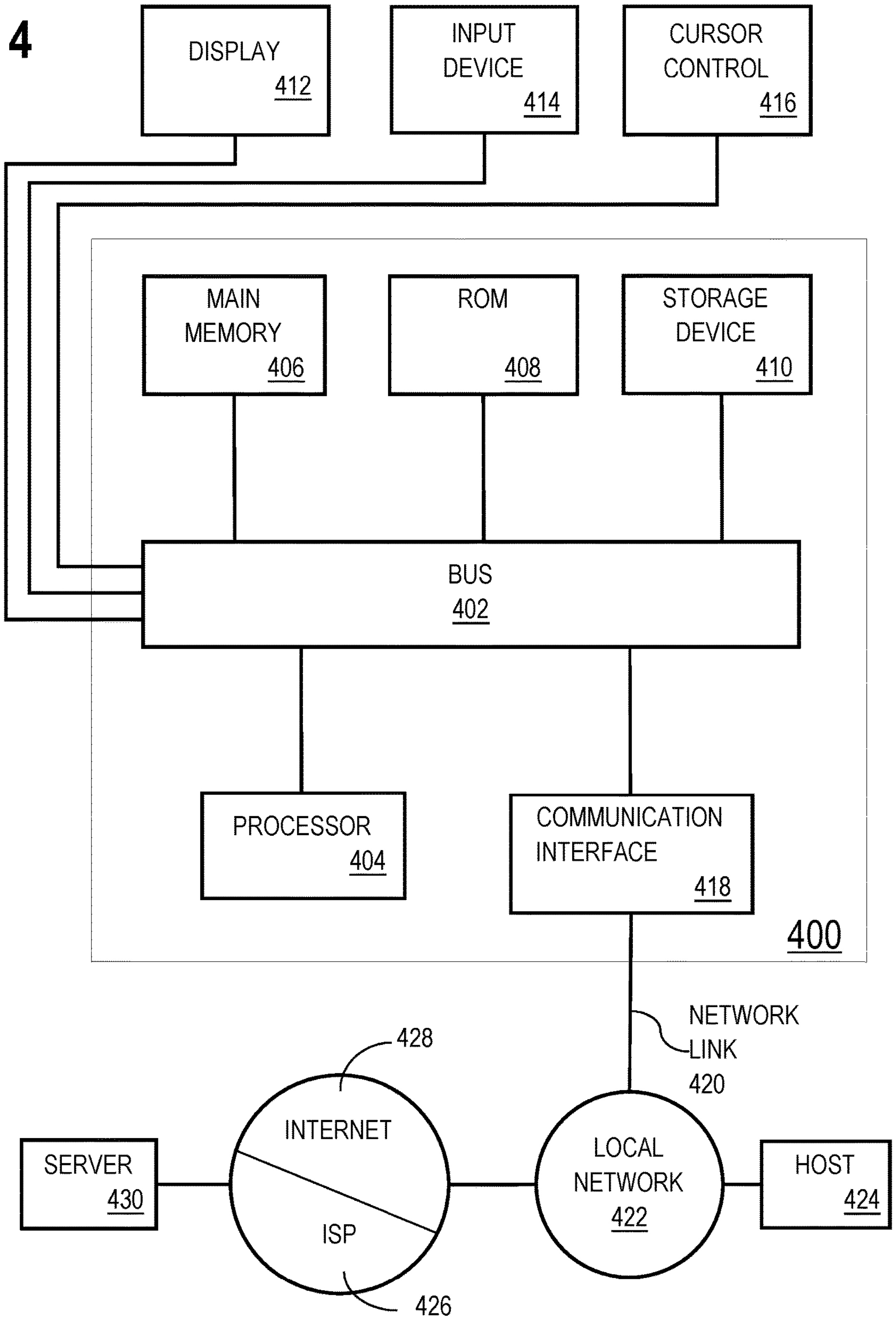
FIG. 4 shows a block diagram illustrating an example computer system in accordance with one or more embodiments.

For example, FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 enables two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. One or more non-transitory computer-readable media storing instructions that, when executed by one or more hardware processors, cause performance of operations comprising:

obtaining a plurality of sample data points;

computing, by a data generator, a plurality of synthetic data points based on the plurality of sample data points;

determining one or more characteristics corresponding to the plurality of sample data points, wherein the one or more characteristics comprise at least a quantity of the plurality of sample data points;

selecting a first operation to partition the plurality of sample data points into machine learning training data and machine learning validation data by allocating each of the plurality of sample data points into one of the machine learning training data or the machine learning validation data, wherein selecting the first operation comprises determining, based on the one or more characteristics, a first allocation ratio specifying (a) a first number of the plurality of sample data points to be allocated to the machine learning training data relative to (b) a second number of the plurality of sample data points to be allocated to the machine learning validation data, and wherein as the quantity of the plurality of sample data points decreases, the first operation increases the (a) the first number of the plurality of sample data points to be allocated to the machine learning training data relative to (b) the second number of the plurality of sample data points to be allocated to the machine learning validation data;

selecting a second operation to partition the plurality of synthetic data points into the machine learning training data and the machine learning validation data by allocating each of the plurality of synthetic data points into one of the machine learning training data or the machine learning validation data:

wherein selecting the second operation comprises determining, based on the one or more characteristics, a second allocation ratio specifying (a) a third number of the plurality of synthetic data points to be allocated to the machine learning validation data relative to (b) a fourth number of the plurality of synthetic data points to be allocated to the machine learning training data, and wherein, as the quantity of the plurality of sample data points decreases, the second operation decreases the (a) the third number of the plurality of synthetic data points to be allocated to the machine learning validation data relative to (b) the fourth number of the plurality of synthetic data points to be allocated to the machine learning training data;

partitioning, using the first operation, the plurality of sample data points into the machine learning training data and the machine learning validation data;

partitioning, using the second operation, the plurality of synthetic data points into the machine learning training data and the machine learning validation data;

training a machine learning model using the machine learning training data, wherein:

the machine learning training data comprises (a) a portion of the plurality of sample data points allocated by the first operation to the machine learning training data and (b) a portion of the plurality of synthetic data points allocated by the second operation to the machine learning training data, and the allocation of the machine learning training data improves training and performance of the machine learning model by improving the quantity of sample data points available for training while ensuring the machine learning validation data comprises synthetic data points that reflect properties of the plurality of sample data points; and validating the machine learning model using the machine learning validation data, wherein validating comprises:

evaluating the machine learning model against the machine learning validation data to generate a performance score; and based on the performance score, selecting the machine learning model for deployment.

2. The media of claim 1, wherein the one or more characteristics corresponding to the plurality of sample data points comprise a quantity of the plurality of sample data points.

3. The media of claim 1, wherein the one or more characteristics corresponding to the plurality of sample data points comprise variations among the plurality of sample data points.

4. The media of claim 1, wherein the characteristics of sample data points determine the partitioning of the synthetic data points.

5. The media of claim 1, wherein the characteristics of sample data points determine the partitioning of the sample data points.

6. The media of claim 1, wherein the operations further comprise partitioning synthetic data points and sample data points defined as hyperparameters used for training a machine learning model.

7. The media of claim 1, wherein:

the first operation comprises allocating all data points in the plurality of sample data points into the machine learning training data; and the second operation comprises allocating all data points in the plurality of synthetic data points into the machine learning validation data.

8. The media of claim 1, wherein the first operation comprises:

allocating a first portion of the plurality of sample data points into the machine learning training data; and allocating a second portion of the plurality of sample data points into the machine learning validation data.

9. The media of claim 8, wherein the second operation comprises:

allocating a first portion of the plurality of synthetic data points into the machine learning training data; and allocating a second portion of the plurality of synthetic data points into the machine learning validation data.

10. The media of claim 1, wherein:

the characteristics comprise a quantity of the sample data points; and the first operation partitions the sample data points based on a comparison of the quantity of data points to a plurality of threshold values.

11. The media of claim 1, wherein:

the characteristics comprise a quantity of data points in one or more classes of the sample data points.

12. The media of claim 1, wherein:

the characteristics comprise a variation in one or more classes of data points included in the sample data points.

13. A method comprising:

obtaining a plurality of sample data points;

computing, by a data generator, a plurality of synthetic data points based on the plurality of sample data points;

determining one or more characteristics corresponding to the plurality of sample data points, wherein the one or more characteristics comprise at least a quantity of the plurality of sample data points;

selecting a first operation to partition the plurality of sample data points into machine learning training data and machine learning validation data by allocating each of the plurality of sample data points into one of the machine learning training data or the machine learning validation data, wherein selecting the first operation comprises determining, based on the one or more characteristics, a first allocation ratio specifying (a) a first number of the plurality of sample data points to be allocated to the machine learning training data relative to (b) a second number of the plurality of sample data points to be allocated to the machine learning validation data, and wherein as the quantity of the plurality of sample data points decreases, the first operation increases the (a) the first number of the plurality of sample data points to be allocated to the machine learning training data relative to (b) the second number of the plurality of sample data points to be allocated to the machine learning validation data;

selecting a second operation to partition the plurality of synthetic data points into the machine learning training data and the machine learning validation data by allocating each of the plurality of synthetic data points into one of the machine learning training data or the machine learning validation data:

wherein selecting the second operation comprises determining, based on the one or more characteristics, a second allocation ratio specifying (a) a third number of the plurality of synthetic data points to be allocated to the machine learning validation data relative to (b) a fourth number of the plurality of synthetic data points to be allocated to the machine learning training data, and wherein, as the quantity of the plurality of sample data points decreases, the second operation decreases the (a) the third number of the plurality of synthetic data points to be allocated to the machine learning validation data relative to (b) the fourth number of the plurality of synthetic data points to be allocated to the machine learning training data;

partitioning, using the first operation, the plurality of sample data points into the machine learning training data and the machine learning validation data;

partitioning, using the second operation, the plurality of synthetic data points into the machine learning training data and the machine learning validation data;

training a machine learning model using the machine learning training data, wherein:

the machine learning training data comprises (a) a portion of the plurality of sample data points allocated by the first operation to the machine learning training data and (b) a portion of the plurality of synthetic data points allocated by the second operation to the machine learning training data, and the allocation of the machine learning training data improves training and performance of the machine learning model by improving the quantity of sample data points available for training while ensuring the machine learning validation data comprises synthetic data points that reflect properties of the plurality of sample data points; and validating the machine learning model using the machine learning validation data, wherein validating comprises:

evaluating the machine learning model against the machine learning validation data to generate a performance score; and based on the performance score, selecting the machine learning model for deployment.

14. The method of claim 13, wherein the one or more characteristics corresponding to the plurality of sample data points comprise a quantity of the plurality of sample data points.

15. The method of claim 13, wherein the one or more characteristics corresponding to the plurality of sample data points comprise variations among the plurality of sample data points.

16. The method of claim 13, wherein the characteristics of sample data points determine the partitioning of the synthetic data points.

17. The method of claim 13, wherein the characteristics of sample data points determine the partitioning of the sample data points.

18. The method of claim 13, wherein the operations further comprise partitioning synthetic data points and sample data points defined as hyperparameters used for training the machine learning model.

19. The method of claim 13, wherein:

the first operation comprises allocating all data points in the plurality of sample data points into the machine learning training data; and the second operation comprises allocating all data points in the plurality of synthetic data points into the machine learning validation data.

20. The method of claim 13, wherein the first operation comprises:

allocating a first portion of the plurality of sample data points into the machine learning training data; and allocating a second portion of the plurality of sample data points into the machine learning validation data.

21. The method of claim 20, wherein the second operation comprises:

allocating a first portion of the plurality of synthetic data points into the machine learning training data; and allocating a second portion of the plurality of synthetic data points into the machine learning validation data.

22. A system comprising:

at least one device including a hardware processor; and the system being configured to perform operations comprising:

obtaining a plurality of sample data points;

computing, by a data generator, a plurality of synthetic data points based on the plurality of sample data points;

determining one or more characteristics corresponding to the plurality of sample data points, wherein the one or more characteristics comprise at least a quantity of the plurality of sample data points;

selecting a first operation to partition the plurality of sample data points into machine learning training data and machine learning validation data by allocating each of the plurality of sample data points into one of the machine learning training data or the machine learning validation data, wherein selecting the first operation comprises determining, based on the one or more characteristics, a first allocation ratio specifying (a) a first number of the plurality of sample data points to be allocated to the machine learning training data relative to (b) a second number of the plurality of sample data points to be allocated to the machine learning validation data, and wherein as the quantity of the plurality of sample data points decreases, the first operation increases the (a) the first number of the plurality of sample data points to be allocated to the machine learning training data relative to (b) the second number of the plurality of sample data points to be allocated to the machine learning validation data;

selecting a second operation to partition the plurality of synthetic data points into the machine learning training data and the machine learning validation data by allocating each of the plurality of synthetic data points into one of the machine learning training data or the machine learning validation data:

wherein selecting the second operation comprises determining, based on the one or more characteristics, a second allocation ratio specifying (a) a third number of the plurality of synthetic data points to be allocated to the machine learning validation data relative to (b) a fourth number of the plurality of synthetic data points to be allocated to the machine learning training data, and wherein, as the quantity of the plurality of sample data points decreases, the second operation decreases the (a) the third number of the plurality of synthetic data points to be allocated to the machine learning validation data relative to (b) the fourth number of the plurality of synthetic data points to be allocated to the machine learning training data;

partitioning, using the first operation, the plurality of sample data points into the machine learning training data and the machine learning validation data;

partitioning, using the second operation, the plurality of synthetic data points into the machine learning training data and the machine learning validation data;

training a machine learning model using the machine learning training data, wherein:

the machine learning training data comprises (a) a portion of the plurality of sample data points allocated by the first operation to the machine learning training data and (b) a portion of the plurality of synthetic data points allocated by the second operation to the machine learning training data, and the allocation of the machine learning training data improves training and performance of the machine learning model by improving the quantity of sample data points available for training while ensuring the machine learning validation data comprises synthetic data points that reflect properties of the plurality of sample data points; and validating the machine learning model using the machine learning validation data, wherein validating comprises:

evaluating the machine learning model against the machine learning validation data to generate a performance score; and based on the performance score, selecting the machine learning model for deployment.

* * * * *